United States Patent
Yu et al.

(10) Patent No.: US 8,711,773 B2
(45) Date of Patent: Apr. 29, 2014

(54) MULTI-CARRIER OPERATION FOR WIRELESS SYSTEMS

(75) Inventors: Dong-Sheng Yu, Ottawa (CA); Hosein Nikopourdeilami, Ottawa (CA); Mo-Han Fong, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 270 days.

(21) Appl. No.: 12/874,853

(22) Filed: Sep. 2, 2010

(65) Prior Publication Data

US 2012/0057524 A1 Mar. 8, 2012

Related U.S. Application Data

(63) Continuation-in-part of application No. 12/806,193, filed on Sep. 2, 2009.

(60) Provisional application No. 61/094,644, filed on Sep. 5, 2008.

(51) Int. Cl.
  *H04W 4/00* (2009.01)
(52) U.S. Cl.
  USPC ........................................... 370/328; 370/331
(58) Field of Classification Search
  None
  See application file for complete search history.

(56) References Cited

U.S. PATENT DOCUMENTS

| | | | |
|---|---|---|---|
| 7,986,959 B2 | 7/2011 | Malladi et al. | |
| 8,107,987 B2 | 1/2012 | Malladi et al. | |
| 2001/0002290 A1 | 5/2001 | Kim et al. | |
| 2003/0087643 A1* | 5/2003 | Mazzara | 455/450 |
| 2003/0088695 A1* | 5/2003 | Kwak et al. | 709/238 |
| 2006/0280142 A1* | 12/2006 | Damnjanovic et al. | 370/329 |
| 2007/0091817 A1 | 4/2007 | Yoon et al. | |
| 2007/0201437 A1 | 8/2007 | Kim et al. | |
| 2008/0267165 A1 | 10/2008 | Bertrand et al. | |
| 2009/0185632 A1* | 7/2009 | Cai et al. | 375/260 |
| 2009/0274096 A1 | 11/2009 | Fu | |
| 2009/0274120 A1* | 11/2009 | Chou | 370/331 |
| 2009/0303951 A1 | 12/2009 | Lunttila et al. | |
| 2009/0310563 A1* | 12/2009 | Chou et al. | 370/331 |
| 2010/0034163 A1 | 2/2010 | Damnjanovic et al. | |
| 2010/0035625 A1 | 2/2010 | Damnjanovic et al. | |

(Continued)

FOREIGN PATENT DOCUMENTS

| | | |
|---|---|---|
| WO | 2010/032969 | 3/2010 |
| WO | 2010/053334 | 5/2010 |
| WO | PCT/CA2010/001352 | 1/2011 |

OTHER PUBLICATIONS

Fong, M. et al. "Proposal for IEEE 802.16m Multi-Carrier Operation". IEEE 802.16m Task Force m (TGm), Document No. IEEE C802.16m-08/1063, Sep. 5, 2008, 10 pages.

(Continued)

*Primary Examiner* — Faruk Hamza
*Assistant Examiner* — Diane Lo
(74) *Attorney, Agent, or Firm* — Fish & Richardson P.C.

(57) ABSTRACT

A method for a subscriber station to perform network entry in a multi-carrier wireless environment that has a primary carrier and at least one secondary carrier associated with a base station. The method includes sensing a carrier in an area serviced by the base station and determining if the carrier is a primary carrier or a secondary carrier. The method further includes performing the network entry if the determining establishes that the sensed carrier is a primary carrier and not a secondary carrier.

23 Claims, 15 Drawing Sheets

(56) References Cited

U.S. PATENT DOCUMENTS

| | | |
|---|---|---|
| 2010/0056202 A1 | 3/2010 | Li et al. |
| 2010/0098012 A1 | 4/2010 | Bala et al. |
| 2010/0130219 A1 | 5/2010 | Cave et al. |
| 2010/0271970 A1 | 10/2010 | Pan et al. |
| 2010/0316026 A1 | 12/2010 | Lee et al. |
| 2011/0002290 A1 | 1/2011 | Kim et al. |
| 2011/0044220 A1 | 2/2011 | Park et al. |
| 2011/0076999 A1 | 3/2011 | Kazmi et al. |
| 2011/0086662 A1 | 4/2011 | Fong et al. |
| 2012/0008580 A1 | 1/2012 | Lee et al. |

OTHER PUBLICATIONS

Cho, J. et al. "Proposed text of Multi-carrier operation for the IEEE802.16m Amendment". IEEE 802.16m Task Force m (TGm), Document No. IEEE C802.16m-09/0869, Apr. 27, 2009, 11 pages.

Wang, L. et al. "Comments on the Multi-carrier DG Harmonized Text Proposal—Mac (1283)". IEEE 802.16 Broadband Wireless Access Working Group, Document No. IEEE C802.16m-09/1619, Jul. 12, 2009, 15 pages.

Ahmadi, S. et al "Proposed Changes/Refinements to the Sections 4-9, 13, 14 and 17 of IEEE 802.16m SDD" IEEE 802.16 Broadband Wireless Access Working Group, Document No. IEEE C802.16m-09/1196, Jul. 3, 2009, 52 pages.

IEEE 802.16 Task Group m (TGm), "The Draft IEEE 802.16m System Description Document" IEEE 802.16 Broadband Wireless Access Working Group, Document No. IEEE 802.16m-08/003, Jan. 23, 2008, 19 pages.

Ahmad, S. et al.; "Proposed Changes/Refinements to the Sections 4-9, 13, 14 and 17 of IEEE 802.16m SDD"; IEEE 802.16 Broadband Wireless Access Working Group; Document No. IEEE C802.16m-09/1196; Jul. 3, 2009; 52 pages.

Cho, J. et al.; "Proposed Text of Multi-Carrier Operation for the IEEE 802.16m Amdendment"; IEEE 802.16m Task Force m (TGm); Document No. IEEE C802.16m-09/0869; Apr. 27, 2009; 11 pages.

Fong, M. et al.; "Proposal for IEEE 802.16m Multi-Carrier Operation"; IEEE 802.16m Task Force (TGm); Document No. IEEE C802.16m-08/1063; Sep. 5, 2008; 10 pages.

IEEE 802.16 Task Group m (TGm); "The Draft IEEE 802.16m System Description Document"; IEEE 802.16 Broadband Wireless Access Working Group; Document No. IEEE 802.16m-08/003; Jan. 23, 2008; 19 pages.

Wang, L. et al.; "Comments on the Multi-Carrier DG Harmonized Text Proposal—MAC (1283)", IEEE 802.16 Broadband Wireless Access Working Group; Document No. IEEE C802.16m-09/1619; Jul. 12, 2009; 15 pages.

International Search Report and Written Opinion of the International Searching Authority issued in International Application No. PCT/CA2010/001352; 13 pages.

Office Action issued in U.S. Appl. No. 12/806,193 on May 9, 2013; 23 pages.

Office Action issued in U.S. Appl. No. 13/618,404 on May 10, 2013; 14 pages.

Office Action issued in U.S. Appl. No. 12/806,193 on Aug. 19, 2013; 27 pages.

International Preliminary Report in Patentability issued in International Application No. PCT/CA2010/001352 on Mar. 6, 2012; 9 pages.

Advisory Action issued in U.S. Appl. No. 12/806,193 on Oct. 28, 2013; 5 pages.

Office Action issued in U.S. Appl. No. 13/618,404 on Oct. 9, 2013; 15 pages.

Office Action issued in U.S. Appl. No. 13/620,418 on Jan. 27, 2014.

\* cited by examiner

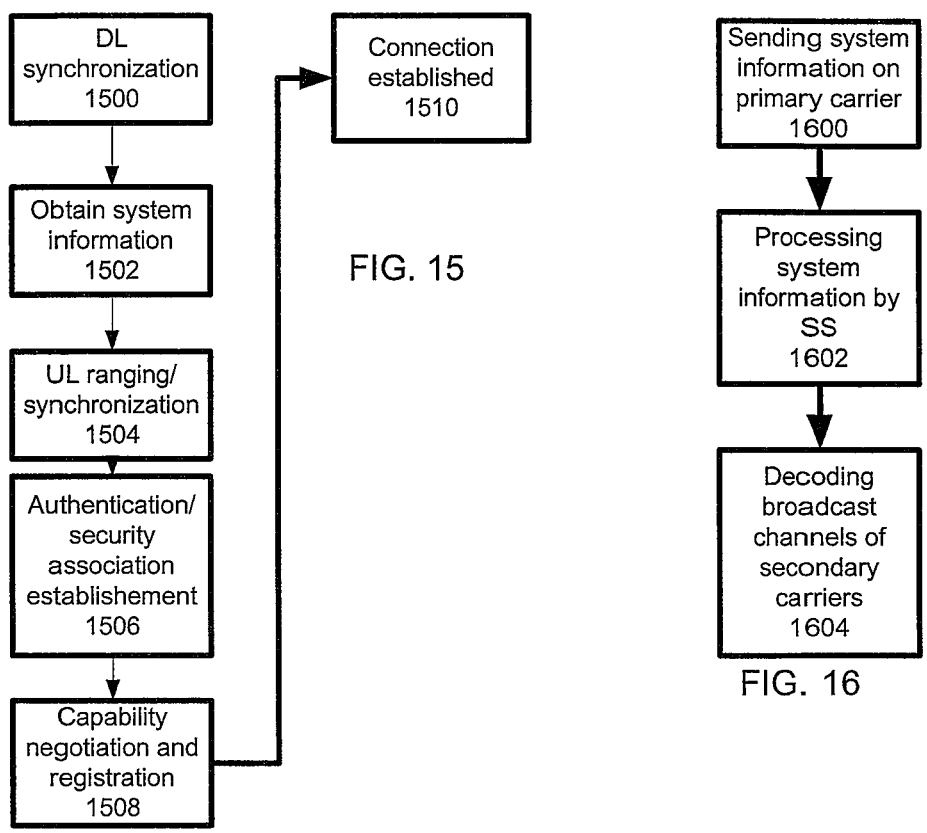

MULTI-CARRIER OPERATION FOR WIRELESS SYSTEMS

CROSS-REFERENCE TO RELATED APPLICATIONS

This application is a continuation-in-part of the non-provisional application Ser. No. 12/806,193 resulting from conversion under 37 C.F.R. §1.53(c)(3) of U.S. provisional patent application No. 61/239,204 filed on Sep. 2, 2009, and which claims the benefit of U.S. provisional patent application No. 61/094,644 filed on Sep. 5, 2008.

The subject matter of the present invention is related to U.S. Patent Application Ser. No. 61/035,363, filed on Mar. 10, 2008, hereby incorporated by reference herein.

The subject matter of the present invention is also related to U.S. patent application Ser. No. 10/141,013, filed on May 8, 2002 (now U.S. Pat. No. 7,492,737), hereby incorporated by reference herein.

FIELD OF THE INVENTION

This application relates to wireless communication techniques in general, and more specifically to multi-carrier operations for wireless systems

BACKGROUND

The demand for services in which data is delivered via a wireless connection has grown in recent years and is expected to continue to grow. Included are applications in which data is delivered via cellular mobile telephony or other mobile telephony, personal communications systems (PCS) and digital or high definition television (HDTV). Though the demand for these services is growing, the channel bandwidth over which the data may be delivered is limited. Therefore, it is desirable to deliver data at high speeds over this limited bandwidth in an efficient, as well as cost effective, manner.

One possible approach for delivering high speed data over a channel is by using Orthogonal Frequency Division Multiplexing (OFDM). The high-speed data signals are divided into tens or hundreds of lower speed signals that are transmitted in parallel over respective frequencies within a radio frequency (RF) signal that are known as sub-carrier frequencies ("sub-carriers"). The frequency spectra of the sub-carriers overlap so that the spacing between them is minimized. The sub-carriers are also orthogonal to each other so that they are statistically independent and do not create crosstalk or otherwise interfere with each other. As a result, the channel bandwidth is used much more efficiently than in conventional single carrier transmission schemes such as AM/FM (amplitude or frequency modulation).

Another approach to providing more efficient use of the channel bandwidth is to transmit the data using a base station having multiple antennas and then receive the transmitted data using a remote station having multiple receiving antennas, referred to as Multiple Input-Multiple Output (MIMO). The data may be transmitted such that there is spatial diversity between the signals transmitted by the respective antennas, thereby increasing the data capacity by increasing the number of antennas. Alternatively, the data is transmitted such that there is temporal diversity between the signals transmitted by the respective antennas, thereby reducing signal fading.

The notion of using multiple carriers in a wireless system is a known concept. Multiple carriers offer the possibility of providing the end user with a rich portfolio of services, such as voice and high speed data applications. However, there is a need in the industry to develop specific operational techniques and methodologies for such wireless systems in order to improve network performance and efficiency.

SUMMARY

As embodied and broadly described herein the invention also provides a method for an SS to perform network entry in a multi-carrier wireless environment that has a plurality of primary carriers and at least one secondary carrier associated with a BS. The method comprising receiving at the SS control information sent over one of the primary carriers, processing with the SS the control information to determine if the network entry is to be performed over the one of the primary carriers or a different primary carrier of the plurality of primary carriers and performing the network entry on the basis of the determining.

As embodied and broadly described herein the invention also provides a method, in a multi-carrier wireless environment that has a primary carrier and at least one secondary carrier associated with a BS, which comprises, the BS sending over the primary carrier control information to an SS and the SS initiating in response to the control information a UL ranging with the secondary carrier.

As embodied and broadly described herein the invention also provides, in a multi-carrier wireless environment that has a primary carrier and at least one secondary carrier associated with a BS, a method for delivering system information on the secondary carrier to an SS, which comprises, the BS sending over the primary carrier control data to an SS, the control data conveying decoding information and the SS decoding a broadcast channel of the secondary carrier on the basis of the decoding information.

As embodied and broadly described herein the invention provides, in a multi-carrier wireless environment that has a plurality of primary carriers and at least one secondary carrier associated with a BS, a method for performing intra-BS handover, which includes the BS sending to the SS over a first of the plurality of the primary carriers control data and the SS switching to a second of the plurality of the primary carriers in response to the control data.

As embodied and broadly described herein the invention also provides a method for performing handover of an SS from a first BS to a second BS, wherein the first BS manages a first multicarrier wireless environment having at least one primary carrier and a secondary carrier; and the second BS manages a second multicarrier wireless environment having at least one primary carrier and a secondary carrier. The method including, the first BS sending to the SS over the primary carrier in the first environment control data, the control data conveying a multi carrier configuration information of the second wireless environment and the SS switching to the second BS for services on the basis of the control data.

As embodied and broadly described herein, the invention further provides a method for managing sleep mode of an SS in a multicarrier wireless environment that is served by a BS and has a primary carrier and a secondary carrier. The method includes, the SS monitoring successive listening windows on the primary carrier for data traffic indication, a data traffic is indication in any one of the listening windows being indicative of data traffic for the SS and whether the data traffic will be delivered over the primary carrier or the secondary carrier. The SS then monitors the carrier indicated by the data traffic indication for the data traffic.

As embodied and broadly described herein the invention also provides a method for feeding back to a BS CQI in a wireless multi-carrier environment serviced by the BS, wherein the multi-carrier environment has a primary carrier and a secondary carrier. The method includes establishing communication between an SS and the BS over the primary carrier and the secondary carrier, wherein the primary carrier establishes a UL feedback control channel. The method further includes generating at the SS CQI in connection with the secondary carrier and transmitting the CQI to the BS over the UL feedback control channel.

As embodied and broadly described herein, the invention further includes a method for feeding back to a BS CQI in a wireless multi-carrier environment serviced by the BS, wherein the multi-carrier environment has a primary carrier and a secondary carrier. The method includes establishing communication between an SS and the BS over the primary carrier and the secondary carrier, wherein the secondary carrier establishes a UL feedback control channel. The method further includes generating at the SS CQI in connection with the secondary carrier and transmitting the CQI to the BS over the UL feedback control channel.

Aspects and features of the present application will become apparent to those ordinarily skilled in the art upon review of the following description of specific embodiments of a disclosure in conjunction with the accompanying drawing figures and appendices.

BRIEF DESCRIPTION OF THE DRAWINGS

Embodiments of the present application will now be described, by way of example only, with reference to the accompanying drawing figures, wherein:

FIG. 15 is a more detailed block diagram illustrating steps for performing a network entry operation in a wireless multi carrier system;

FIG. 16 is a block diagram illustrating a method for obtaining system information on secondary carriers in a wireless multi carrier operation;

Like reference numerals are used in different figures to denote similar elements.

DETAILED DESCRIPTION

Figure 1:
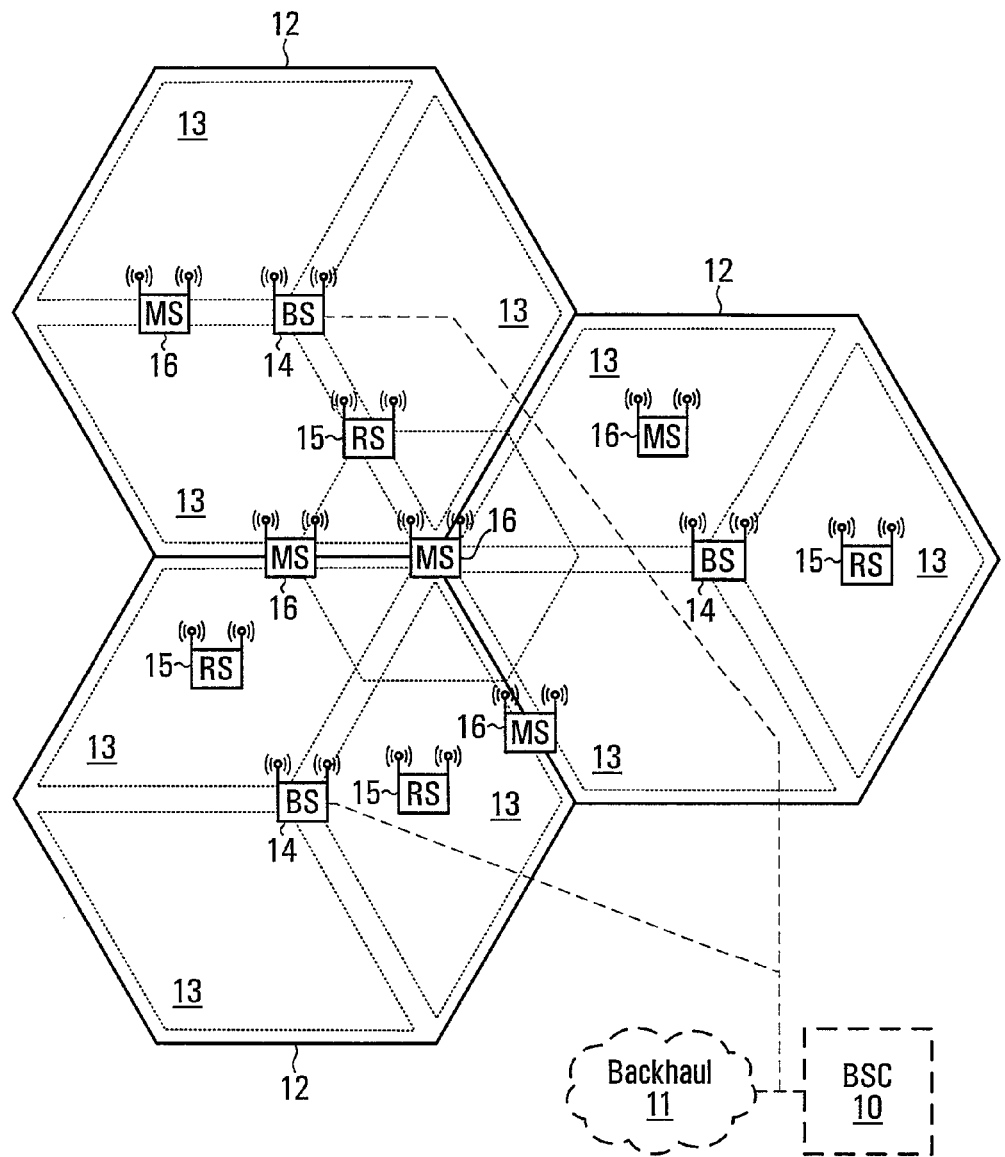
FIG. 1 is a block diagram of a cellular communication system.

Referring to the drawings, FIG. 1 shows a base station controller (BSC) 10 which controls wireless communications within multiple cells 12, which cells are served by corresponding base stations (BS) 14. In some configurations, each cell is further divided into multiple sectors 13 or zones (not shown). In general, each BS 14 facilitates communications using OFDM with subscriber stations, (SS) 16 which can be any entity capable of communicating with the base station, and may include mobile and/or wireless terminals or fixed terminals, which are within the cell 12 associated with the corresponding BS 14. If SSs 16 moves in relation to the BSs 14, this movement results in significant fluctuation in channel conditions. As illustrated, the BSs 14 and SSs 16 may include multiple antennas to provide spatial diversity for communications. In some configurations, relay stations 15 may assist in communications between BSs 14 and wireless terminals 16. SS 16 can be handed off 18 from any cell 12, sector 13, zone (not shown), BS 14 or relay 15 to another cell 12, sector 13, zone (not shown), BS 14 or relay 15. In some configurations, BSs 14 communicate with each and with another network (such as a core network or the internet, both not shown) over a backhaul network 11. In some configurations, a base station controller 10 is not needed.

Figure 2:
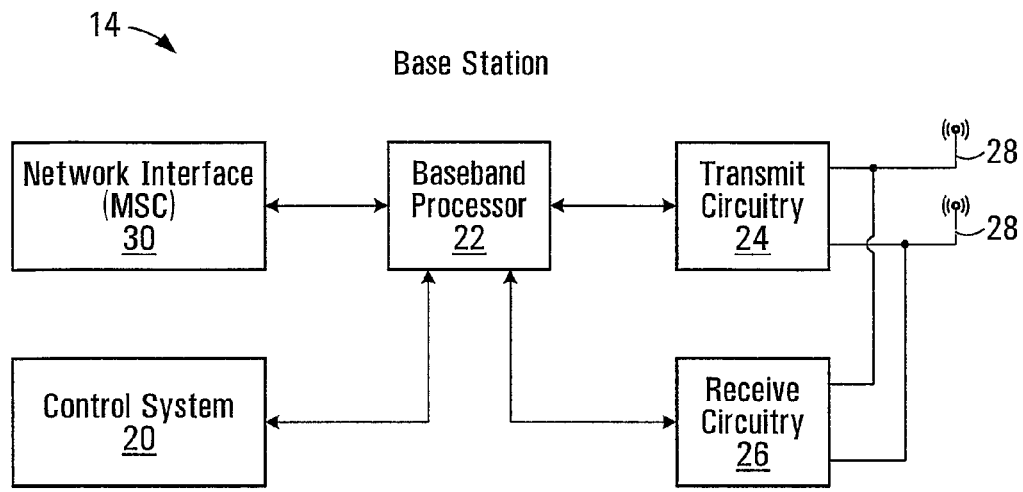
FIG. 2 is a block diagram of an example base station that might be used to implement some embodiments of the present application.

With reference to FIG. 2, an example of a BS 14 is illustrated. The BS 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by SSs 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another SS 16 serviced by the BS 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
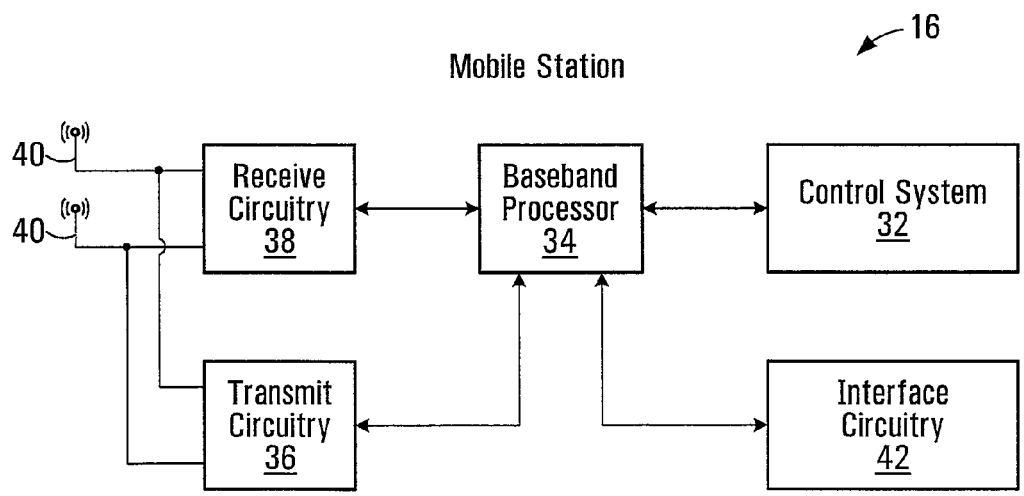
FIG. 3 is a block diagram of an example wireless terminal that might be used to implement some embodiments of the present application.

With reference to FIG. 3, an example of a subscriber station (SS) 16 is illustrated. SS 16 can be, for example a mobile station. Similarly to the BS 14, the SS 16 will include a control system 32, a baseband processor 34, transmit circuitry 36, receive circuitry 38, multiple antennas 40, and user interface circuitry 42. The receive circuitry 38 receives radio frequency signals bearing information from one or more BSs 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract is the information or data bits conveyed in the received signal. This processing typically comprises demodulation, decoding, and error correction operations. The baseband processor 34 is generally implemented in one or more digital signal processors (DSPs) and application specific integrated circuits (ASICs). For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the SS and the base station, either directly or via the relay station.

In OFDM modulation, the transmission band is divided into multiple, orthogonal subcarriers. Each subcarrier is modulated according to the digital data to be transmitted. Because OFDM divides the transmission band into multiple subcarriers, the bandwidth per carrier decreases and the modulation time per carrier increases. Since the multiple subcarriers are transmitted in parallel, the transmission rate for the digital data, or symbols (discussed later), on any given subcarrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal subcarriers are generated for multiple bands within a transmission channel. The modulated signals are digital signals having a relatively low transmission rate and capable of staying within their respective bands. The individual subcarriers are not modulated directly by the digital signals. Instead, all subcarriers are modulated at once by IFFT processing.

In operation, OFDM is preferably used for at least the downlink transmission from the BSs 14 to the SSs 16. Each BS 14 is equipped with "n" transmit antennas 28 (n>=1), and each SS 16 is equipped with "m" receive antennas 40 (m>=1). Notably, the respective antennas can be used for reception and transmission using appropriate duplexers or switches and are so labeled only for clarity.

When relay stations 15 are used, OFDM is preferably used for downlink transmission from the BSs 14 to the relays 15 and from relay stations 15 to the SSs 16.

Figure 4:
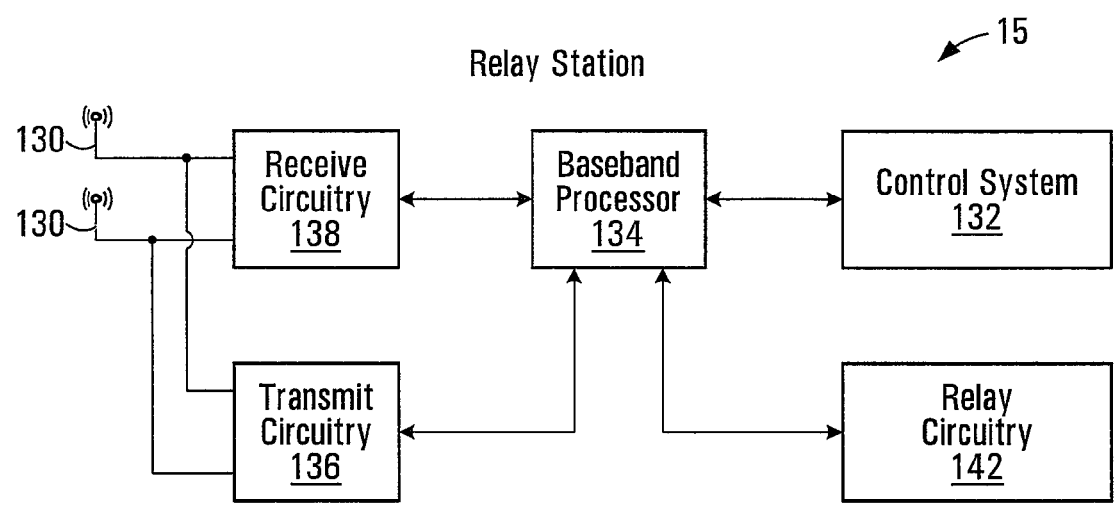
FIG. 4 is a block diagram of an example relay station that might be used to implement some embodiments of the present application.

With reference to FIG. 4, an example of a relay station 15 is illustrated. Similarly to the BS 14, and the SS 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 16 and SSs 16. The receive circuitry 138 receives radio frequency signals bearing information from one or more BSs 14 and SSs 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the SS and the base station, either directly or indirectly via a relay station, as described above.

Figure 5:
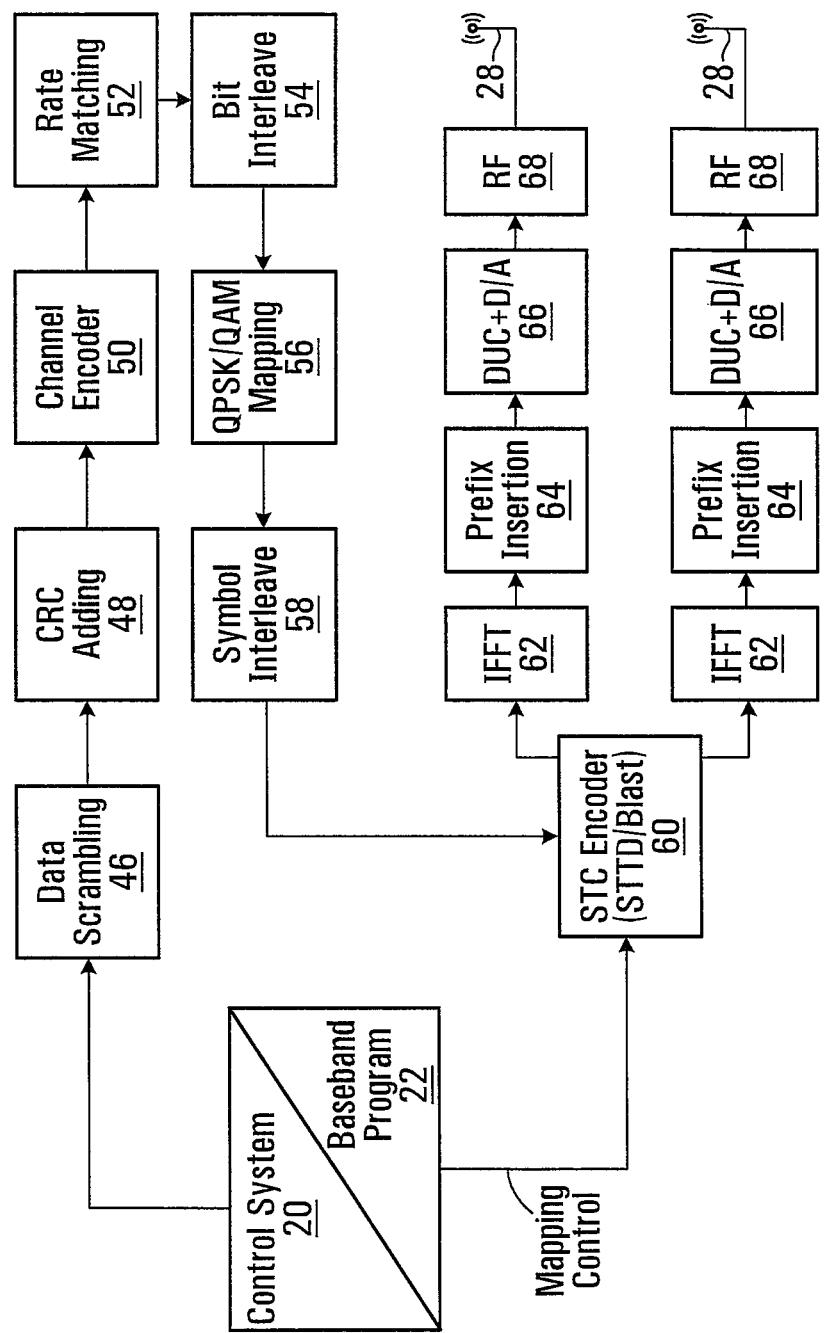
FIG. 5 is a block diagram of a logical breakdown of an example OFDM transmitter architecture that might be used to implement some embodiments of the present application.

With reference to FIG. 5, a logical OFDM transmission architecture will be described. Initially, the base station controller 10 will send data to be transmitted to various SSs 16 to the BS 14, either directly or with the assistance of a relay station 15. The BS 14 may use the information on the quality of channel associated with the SSs to schedule the data for transmission as well as select appropriate coding and modulation for transmitting the scheduled data. The quality of the channel is found using control signals, as described in more details below. Generally speaking, however, the quality of channel for each SS 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data may be determined and appended to the scrambled data using CRC adding logic 48. Next, channel coding is performed using channel encoder logic 50 to effectively add redundancy to the data to facilitate recovery and error correction at the SS 16. Again, the channel coding for a particular SS 16 may be based on the quality of channel. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the modulation scheme chosen by mapping logic 56. The modulation scheme may be, for example, Quadrature Amplitude Modulation (QAM), Quadrature Phase Shift Key (QPSK) or Differential Phase Shift Keying (DPSK) modulation. For transmission data, the degree of modulation may be chosen based on the quality of channel for the particular SS. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a SS 16. The STC encoder logic 60 will process the incoming symbols and provide "n" outputs corresponding to the number of transmit antennas 28 for the BS 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the SS 16.

For the present example, assume the BS 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended SS 16 are scattered among the sub-carriers. The SS 16 may use the pilot signals for channel estimation.

Figure 6:
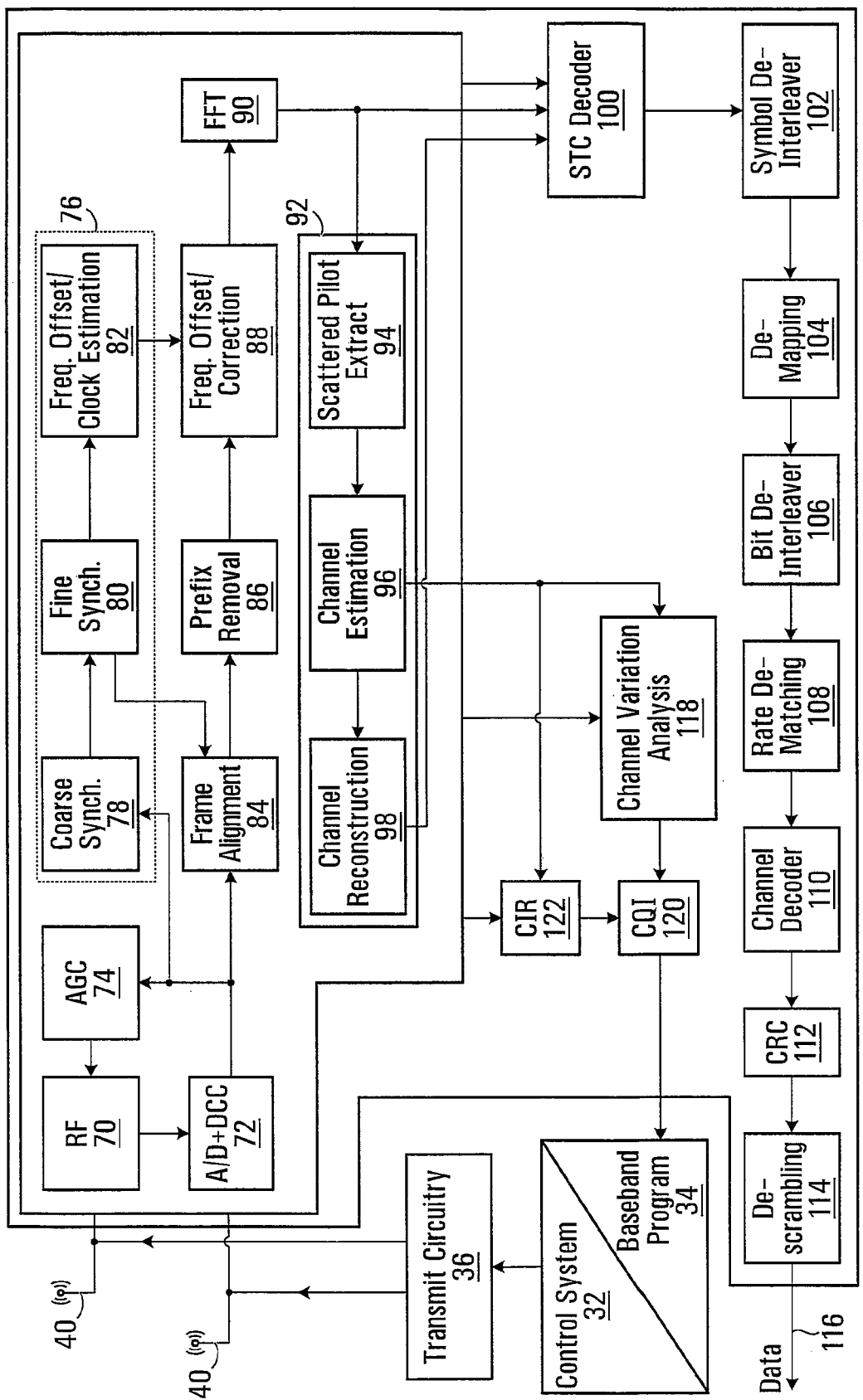
FIG. 6 is a block diagram of a logical breakdown of an example OFDM receiver architecture that might be used to implement some embodiments of the present application.

Reference is now made to FIG. 6 to illustrate reception of the transmitted signals by a SS 16, either directly from BS 14 or with the assistance of relay 15. Upon arrival of the transmitted signals at each of the antennas 40 of the SS 16, the respective signals are demodulated and amplified by corresponding RF circuitry 70. For the sake of conciseness and clarity, only one of the two receive paths is described and illustrated in detail. Analog-to-digital (ND) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level. Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bit stream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for descrambling using the known base station de-scrambling code to recover the originally transmitted data 116.

In parallel to recovering the data 116, a CQI signal comprising an indication of channel quality, or at least information sufficient to derive some knowledge of channel quality at the BS 14, is determined and transmitted to the BS 14. transmission of the CQI signal will be described in more detail below. As noted above, the CQI may be a function of the carrier-to-interference ratio (CR), as well as the degree to which the channel response varies across the various sub-carriers in the OFDM frequency band. For example, the channel gain for each sub-carrier in the OFDM frequency band being used to transmit information may be compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data. In some embodiments, a relay station may operate in a time division manner using only one radio, or alternatively include multiple radios.

FIGS. 1 to 6 provide one specific example of a communication system that could be used to implement embodiments of the application. It is to be understood that embodiments of the application can be implemented with communications systems having architectures that are different than the specific example, but that operate in a manner consistent with the implementation of the embodiments as described herein.

Figure 7:
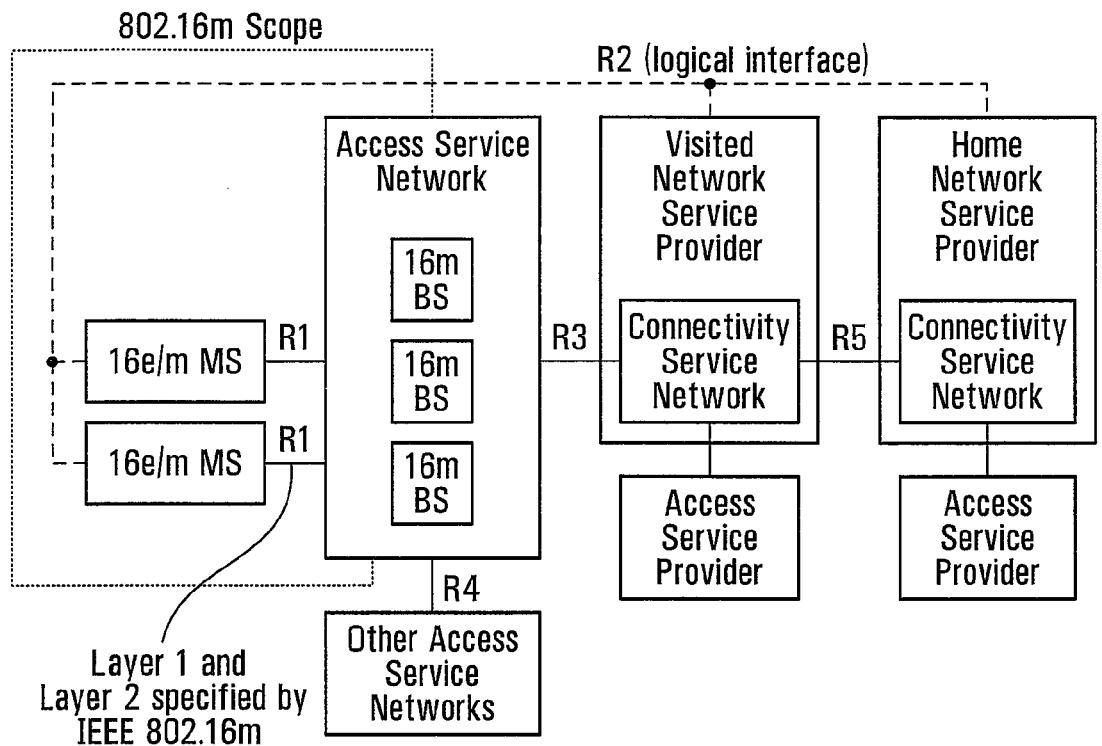
FIG. 7 is FIG. 1 of IEEE 802.16m-08/003rl, an Example of overall network architecture.

Turning now to FIG. 7, there is shown an example network reference model, which is a logical representation of a network that supports wireless communications among the aforementioned BSs 14, SSs 16 and relay sations (RSs) 15, in accordance with a non-limiting embodiment of the present invention. The network reference model identifies functional entities and reference points over which interoperability is achieved between these functional entities. Specifically, the network reference model can include an SS 16, an Access Service Network (ASN), and a Connectivity Service Network (CSN).

The ASN can be defined as a complete set of network functions needed to provide radio access to a subscriber (e.g., an IEEE 802.16e/m subscriber). The ASN can comprise network elements such as one or more BSs 14, and one or more ASN gateways. An ASN may be shared by more than one CSN. The ASN can provide the following functions:
    Layer-1 and Layer-2 connectivity with the SS 16;
    Transfer of AAA messages to subscriber's Home Network Service Provider (H-NSP) for authentication, authorization and session accounting for subscriber sessions
    Network discovery and selection of the subscriber's preferred NSP;
    Relay functionality for establishing Layer-3 (L3) connectivity with the SS 16 (e.g., IP address allocation);
    Radio resource management.

In addition to the above functions, for a portable and mobile environment, an ASN can further support the following functions:
    ASN anchored mobility;
    CSN anchored mobility;
    Paging;
    ASN-CSN tunnelling.

For its part, the CSN can be defined as a set of network functions that provide IP connectivity services to the subscriber. A CSN may provide the following functions:
    MS IP address and endpoint parameter allocation for user sessions;
    AAA proxy or server;
    Policy and Admission Control based on user subscription profiles;
    ASN-CSN tunnelling support;
    Subscriber billing and inter-operator settlement;
    Inter-CSN tunnelling for roaming;
    Inter-ASN mobility.

The CSN can provide services such as location based services, connectivity for peer-to-peer services, provisioning, authorization and/or connectivity to IP multimedia services. The CSN may further comprise network elements such as routers, AAA proxy/servers, user databases, and interworking gateway MSs. In the context of IEEE 802.16m, the CSN may be deployed as part of a IEEE 802.16m NSP or as part of an incumbent IEEE 802.16e NSP.

Figure 8:
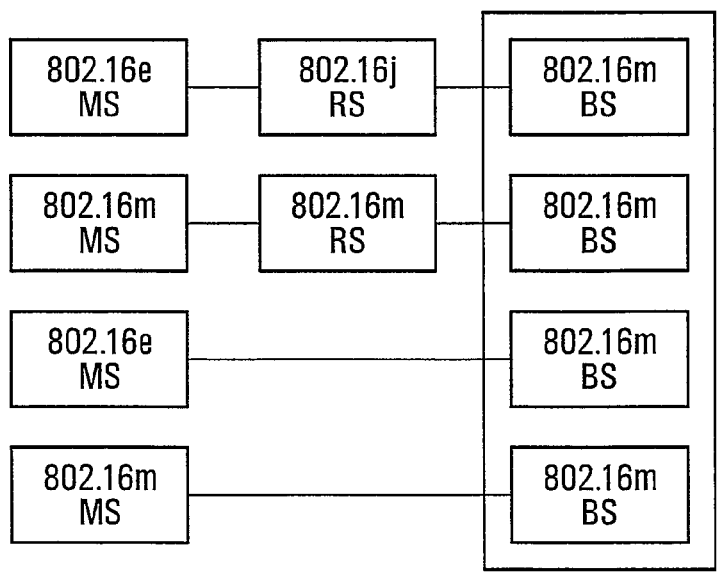
FIG. 8 is FIG. 2 of IEEE 802.16m-08/003rl, a Relay Station in overall network architecture.

In addition, RSs 15 may be deployed to provide improved coverage and/or capacity. With reference to FIG. 8, a BS 14 that is capable of supporting a legacy RS communicates with the legacy RS in the "legacy zone". The BS 14 is not required to provide legacy protocol support in the "16m zone". The relay protocol design could be based on the design of IEEE 802-16j, although it may be different from IEEE 802-16j protocols used in the "legacy zone".

Figure 9:
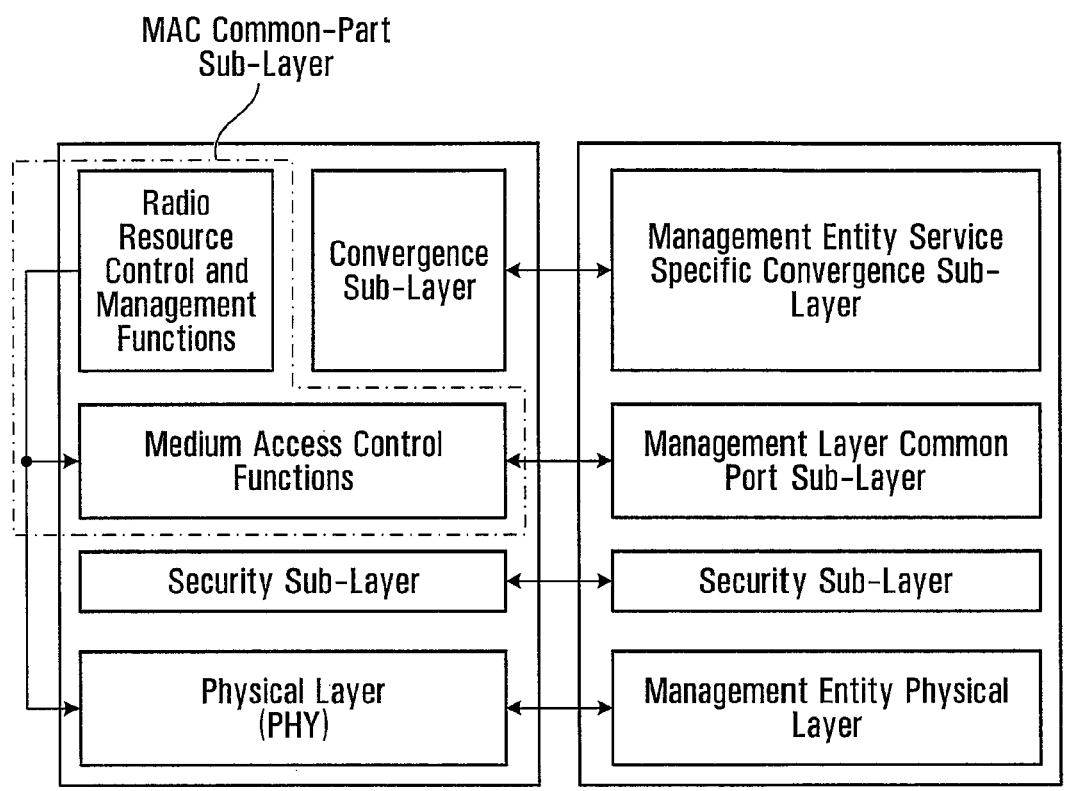
FIG. 9 is FIG. 3 of IEEE 802.16m-08/003rl, a System Reference Model.

With reference now to FIG. 9, there is shown a system reference model, which applies to both the SS 16 and the BS 14 and includes various functional blocks including a Medium Access Control (MAC) common part sublayer, a convergence sublayer, a security sublayer and a physical (PHY) layer.

The convergence sublayer performs mapping of external network data received through the CS SAP into MAC SDUs received by the MAC CPS through the MAC SAP, classification of external network SDUs and associating them to MAC SFID and CID, Payload header suppression/compression (PHS).

The security sublayer performs authentication and secure key exchange and Encryption.

The physical layer performs Physical layer protocol and functions.

The MAC common part sublayer is now described in greater detail. Firstly, it will be appreciated that Medium Access Control (MAC) is connection-oriented. That is to say, for the purposes of mapping to services on the SS 16 and associating varying levels of QoS, data communications are carried out in the context of "connections". In particular, "service flows" may be provisioned when the SS 16 is installed in the system. Shortly after registration of the SS 16, connections are associated with these service flows (one connection per service flow) to provide a reference against which to request bandwidth.

Additionally, new connections may be established when a customer's service needs change. A connection defines both the mapping between peer convergence processes that utilize the MAC and a service flow. The service flow defines the QoS parameters for the MAC protocol data units (PDUs) that are exchanged on the connection. Thus, service flows are integral to the bandwidth allocation process. Specifically, the SS 16 requests uplink bandwidth on a per connection basis (implicitly identifying the service flow). Bandwidth can be granted by the BS to a MS as an aggregate of grants in response to per connection requests from the MS.

Figure 10:
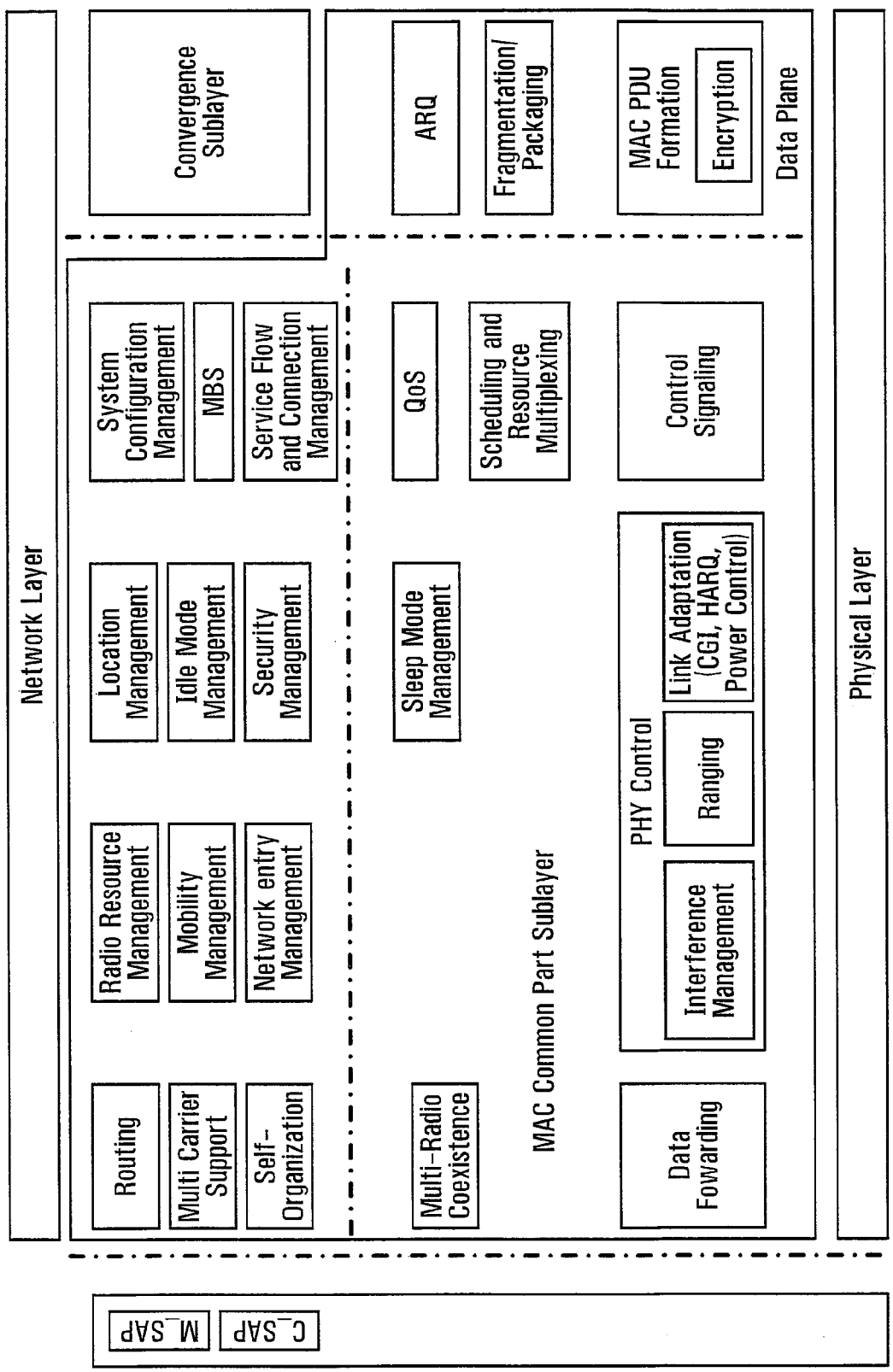
FIG. 10 is FIG. 4 of IEEE 802.16m-08/003rl, The IEEE 802.16m Protocol Structure.

With additional reference to FIG. 10, the MAC common part sublayer (CPS) is classified into radio resource control and management (RRCM) functions and medium access control (MAC) functions.

The RRCM functions include several functional blocks that are related with radio resource functions such as:

Radio Resource Management
Mobility Management
Network Entry Management
Location Management
Idle Mode Management
Security Management
System Configuration Management
MBS (Multicast and Broadcasting Service)
Service Flow and Connection Management
Relay functions
Self Organization
Multi-Carrier Radio Resource Management The Radio Resource Management block adjusts radio network parameters based on traffic load, and also includes function of load control (load balancing), admission control and interference control.

Mobility Management

The Mobility Management block supports functions related to Intra-RAT/Inter-RAT handover. The Mobility Management block handles the Intra-RAT/Inter-RAT Network topology acquisition which includes the advertisement and measurement, manages candidate neighbor target BSs/RSs and also decides whether the MS performs Intra-RAT/Inter-RAT handover operation.

Network Entry Management

The Network Entry Management block is in charge of initialization and access procedures. The Network Entry Management block may generate management messages which are needed during access procedures, i.e., ranging, basic capability negotiation, registration, and so on.

Location Management

The Location Management block is in charge of supporting location based service (LBS). The Location Management block may generate messages including the LBS information.

Idle Mode Management

The Idle Mode Management block manages location update operation during idle mode. The Idle Mode Management block controls idle mode operation, and generates the paging advertisement message based on paging message from paging controller in the core network side.

Security Management

The Security Management block is in charge of authentication/authorization and key management for secure communication.

System Configuration Management

The System Configuration Management block manages system configuration parameters, and system parameters and system configuration information for transmission to the MS.

MBS (Multicast and Broadcasting Service)

The MBS (Multicast Broadcast Service) block controls management messages and data associated with broadcasting and/or multicasting service.

Service Flow and Connection Management

The Service Flow and Connection Management block allocates "MS identifiers" (or station identifiers—STIDs) and "flow identifiers" (FIDs) during access/handover/service flow creation procedures. The MS identifiers and FIDs will be discussed further below.

Relay Functions

The Relay Functions block includes functions to support multi-hop relay mechanisms. The functions include procedures to maintain relay paths between BS and an access RS.

Self Organization

The Self Organization block performs functions to support self configuration and self optimization mechanisms. The functions include procedures to request RSs/MSs to report measurements for self configuration and self optimization and receive the measurements from the RSs/MSs.

Multi-Carrier Support

The Multi-carrier (MC) support block enables a common MAC entity to control a PHY spanning over multiple frequency channels. The channels may be of different bandwidths (e.g. 5, 10 and 20 MHz), be on contiguous or non-contiguous frequency bands. The channels may be of the same or different duplexing modes, e.g. FDD, TDD, or a mix of bidirectional and broadcast only carriers. For contiguous frequency channels, the overlapped guard sub-carriers are aligned in frequency domain in order to be used for data transmission.

The medium access control (MAC) includes function blocks which are related to the physical layer and link controls such as:

PHY Control
Control Signaling
Sleep Mode Management
QoS
Scheduling and Resource Multiplexing
ARQ
Fragmentation/Packing
MAC PDU formation
Multi-Radio Coexistence
Data forwarding
Interference Management
Inter-BS coordination PHY Control The PHY Control block handles PHY signaling such as ranging, measurement/feedback (CQI), and HARQ ACK/NACK. Based on CQI and HARQ ACK/NACK, the PHY Control block estimates channel quality as seen by the MS, and performs link adaptation via adjusting modulation and coding scheme (MCS), and/or power level. In the ranging procedure, PHY control block does uplink synchronization with power adjustment, frequency offset and timing offset estimation.

Control Signaling

The Control Signaling block generates resource allocation messages.

Sleep Mode Management

Sleep Mode Management block handles sleep mode operation. The Sleep Mode Management block may also generate MAC signaling related to sleep operation, and may communicate with Scheduling and Resource Multiplexing block in order to operate properly according to sleep period.

QoS

The QoS block handles QoS management based on QoS parameters input from the Service Flow and Connection Management block for each connection.

Scheduling and Resource Multiplexing

The Scheduling and Resource Multiplexing block schedules and multiplexes packets based on properties of connections. In order to reflect properties of connections Scheduling and Resource Multiplexing block receives QoS information from The QoS block for each connection.

ARQ

The ARQ block handles MAC ARQ function. For ARQ-enabled connections, ARQ block logically splits MAC SDU to ARQ blocks, and numbers each logical ARQ block. ARQ block may also generate ARQ management messages such as feedback message (ACK/NACK information).

Fragmentation/Packing

The Fragmentation/Packing block performs fragmenting or packing MSDUs based on scheduling results from Scheduling and Resource Multiplexing block.

MAC PDU Formation

The MAC PDU formation block constructs MAC PDU so that BS/MS can transmit user traffic or management messages into PHY channel. MAC PDU formation block adds MAC header and may add sub-headers.

Multi-Radio Coexistence

The Multi-Radio Coexistence block performs functions to support concurrent operations of IEEE 802.16m and non-IEEE 802.16m radios collocated on the same mobile station.

Data Forwarding

The Data Forwarding block performs forwarding functions when RSs are present on the path between BS and MS. The Data Forwarding block may cooperate with other blocks such as Scheduling and Resource Multiplexing block and MAC PDU formation block.

Interference Management

The Interference Management block performs functions to manage the inter-cell/sector interference. The operations may include:
  MAC layer operation
  Interference measurement/assessment report sent via MAC signaling
  Interference mitigation by scheduling and flexible frequency reuse
  PHY layer operation
  Transmit power control
  Interference randomization
  Interference cancellation
  Interference measurement
  Tx beamforming/precoding Inter-BS Coordination The Inter-BS coordination performs functions to coordinate the actions of multiple BSs by exchanging information, e.g., interference management. The functions include procedures to exchange information for e.g., interference management between the BSs by backbone signaling and by MS MAC messaging. The information may include interference characteristics, e.g. interference measurement results, etc.

Figure 11:
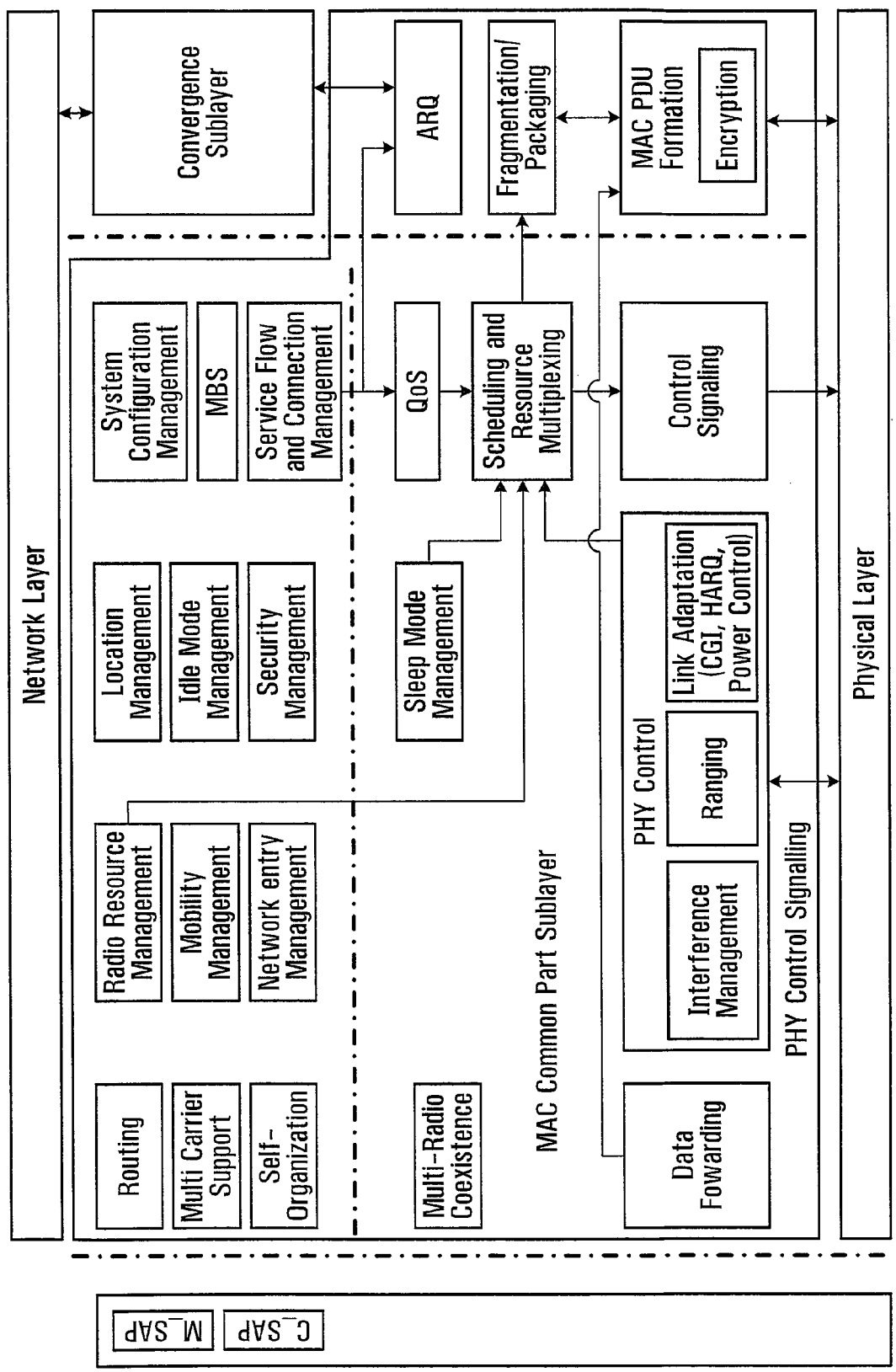
FIG. 11 is FIG. 5 of IEEE 802.16m-08/003rl, The IEEE 802.16m MS/BS Data Plane Processing Flow.

Reference is now made to FIG. 11, which shows the user traffic data flow and processing at the BS 14 and the SS 16. The dashed arrows show the user traffic data flow from the network layer to the physical layer and vice versa. On the transmit side, a network layer packet is processed by the convergence sublayer, the ARQ function (if present), the fragmentation/packing function and the MAC PDU formation function, to form MAC PDU(s) to be sent to the physical layer. On the receive side, a physical layer SDU is processed by MAC PDU formation function, the fragmentation/packing function, the ARQ function (if present) and the convergence sublayer function, to form the network layer packets. The solid arrows show the control primitives among the CPS functions and between the CPS and PHY that are related to the processing of user traffic data.

Figure 12:
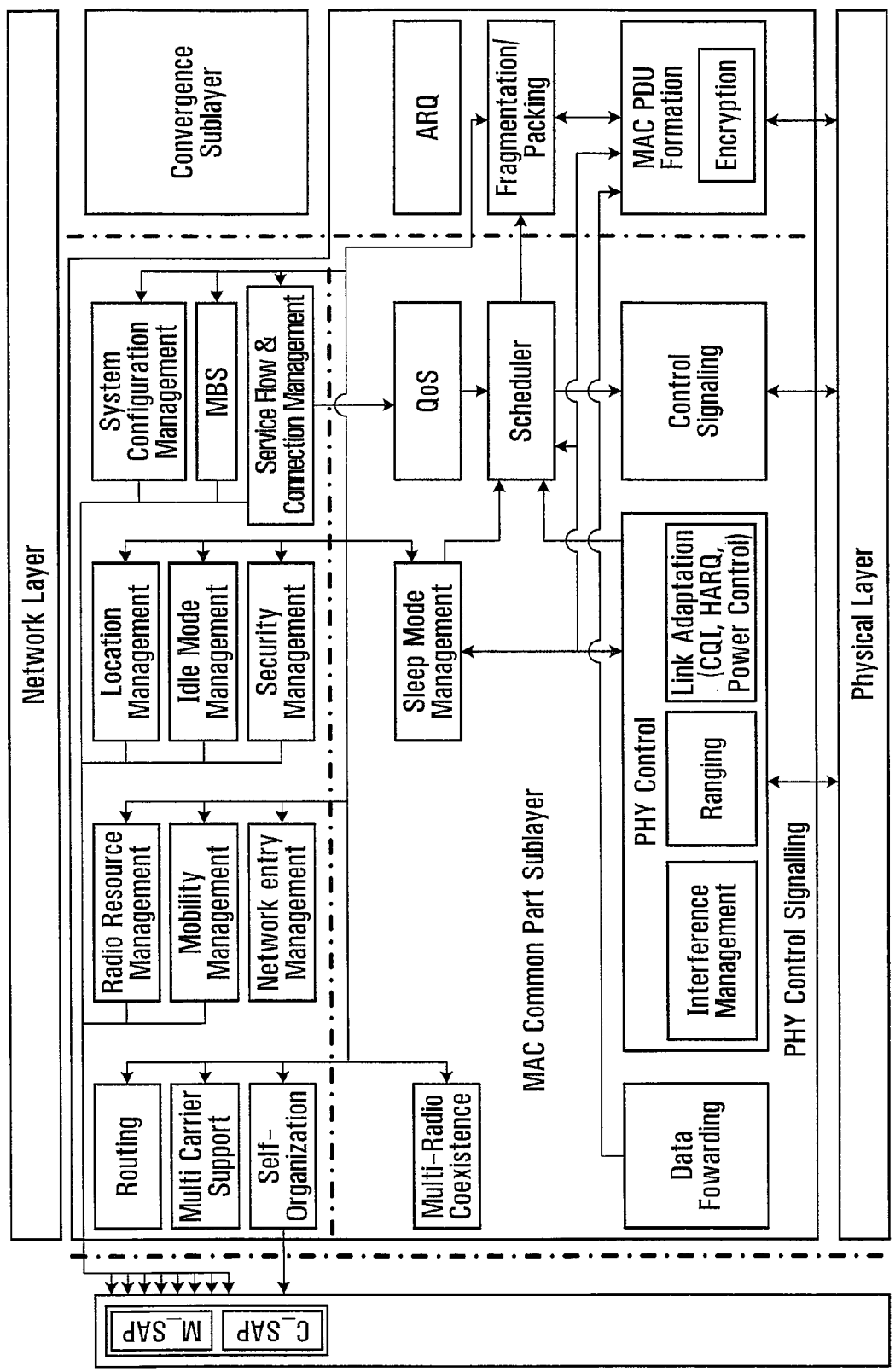
FIG. 12 is FIG. 6 of IEEE 802.16m-08/003rl, The IEEE 802.16m MS/BS Control Plane Processing Flow.

Reference is now made to FIG. 12, which shows the CPS control plane signaling flow and processing at the BS 16 and the MS 14. On the transmit side, the dashed arrows show the flow of control plane signaling from the control plane functions to the data plane functions and the processing of the control plane signaling by the data plane functions to form the corresponding MAC signaling (e.g. MAC management messages, MAC header/sub-header) to be transmitted over the air. On the receive side, the dashed arrows show the processing of the received over-the-air MAC signaling by the data plane functions and the reception of the corresponding control plane signaling by the control plane functions. The solid arrows show the control primitives among the CPS functions and between the CPS and PHY that are related to the processing of control plane signaling. The solid arrows between M_SAP/C_SAP and MAC functional blocks show the control and management primitives to/from Network Control and Management System (NCMS). The primitives to/from M_SAP/C_SAP define the network involved functionalities such as inter-BS interference management, inter/intra RAT mobility management, etc, and management related functionalities such as location management, system configuration etc.

Figure 13:
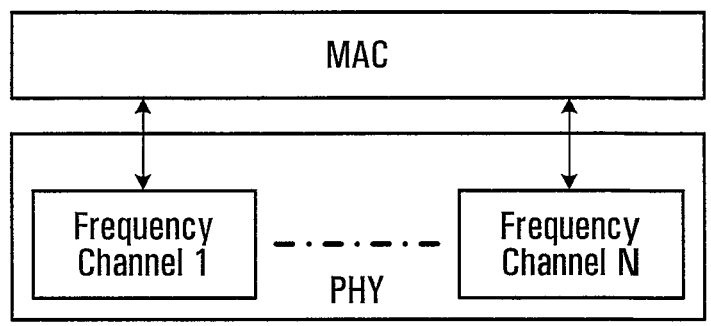
FIG. 13 is FIG. 7 of IEEE 802.16m-08/003rl, Generic protocol architecture to support multicarrier system.

Reference is now made to FIG. 13, which shows a generic protocol architecture to support a multicarrier system. A common MAC entity may control a PHY spanning over multiple frequency channels. Some MAC messages sent on one carrier may also apply to other carriers. The channels may be of different bandwidths (e.g. 5, 10 and 20 MHz), be on contiguous or non-contiguous frequency bands. The channels may be of different duplexing modes, e.g. FDD, TDD, or a mix of bidirectional and broadcast only carriers.

The common MAC entity may support simultaneous presence of MSs 16 with different capabilities, such as operation over one channel at a time only or aggregation across contiguous or non-contiguous channels.

Control signals, like other data, are transmitted over the wireless medium between the BS 14 and an SS 16 using a particular modulation scheme according to which the data is converted into symbols. A symbol is the smallest quantum of information that is transmitted at once. A symbol may represent any number of bits, depending on the modulation scheme used, but commonly represents between 1 and 64 bits, and in some common modulation scheme, each symbol represents 2 bits. Regardless of the modulation scheme used, a single modulated symbol is sent over a single subcarrier and generally represents the smallest quantum of information that can be sent over the air interface.

A wireless communication system of the type described earlier can be designed to operate as a multi carrier system. A multi carrier system divides the spectrum in several carriers that provide different functions. Two types of carriers can be defined, namely:

1. Primary carrier; this is the carrier that typically carries the synchronization channel (or preamble), all the system information, neighbor BS information, paging information and resource to allocation/control information. Examples of control information include:
    a. Essential static system wide PHY information for decoding of DL PHY frames/sub-frames, such as bandwidth configurations, CP sizes, multi carrier configuration, system time, TDD ratio and guard tones among others;
    b. Essential pseudo-dynamic sector-side PHY information for decoding of DL PPHY frames/sub-frames. Examples include channelization (partitioning of diversity zone, localized zone, pilot structure, etc), legacy/16m resource partition, sub-frame control configuration etc. Can also contain initial ranging region/codes information for SS to do fast initial access procedure;

c. Non-PHY system information such as BSID, operator ID and subnet ID among others;

d. PHY/MAC system configuration information such as handover parameters, power control parameters, fast feedback region and ranging region, among others;

e. Neighbor BS information (c and d information about a neighboring BS);

f. Paging information such as quick paging and regular paging information;

g. Dynamic DL and UL resource allocation and control information related to traffic burst assignment, such as burst assignment related information (MCS, MIMO mode resource location, user ID, ACK/NAK of UL traffic and UL power control among others).

2. Secondary carrier; this is a carrier that carries a subset of the system information (such as information of type b above) relating to superframe configuration on that carrier, as well as resource allocation/control information of each sub-frame within the carrier (such as information of the type g above). The secondary carrier can also is convey the synchronization channel (or preamble).

Generally, one or multiple carriers within the spectrum can be designated as primary carriers. Similarly, one or multiple carriers within the spectrum can be designated as secondary carriers. An SS interacts with the carriers differently depending on its capability. A narrowband SS, in other words an SS that has bandwidth capability to transmit/receive on only one carrier at a time is assigned to a primary carrier. However, a wideband SS, in other words an SS that has bandwidth capability to transmit/receive on multiple carriers at a time, is assigned to one or more primary carriers and can also interact with one or more secondary carriers.

In a specific example of implementation, the primary carrier is code division multiplexed using a Walsh code. Pilot, paging and sync channel as defined in CDMA 2000 are transmitted on the primary carrier. These channels will have the same configuration as 1XRTT overhead channels for backward compatibility reasons. The primary carrier can be overlaid to the existing IS95, IS95A&B and 1XRTT carriers. The primary carrier is used to provide voice and other real-time services to users. The primary carrier can also be used to transmit MAC information to the SS.

The secondary carrier(s) are used to provide various types of data services to the users on the forward link. The secondary carriers can be time division multiplexed or code division multiplexed. The assignment of the time slot or code space on the secondary carriers is transmitted by the MAC channels on the primary carriers.

When an SS that can be a mobile or fixed station performs network entry, it does so with a primary carrier of a BS. At this end, the SS will try to determine when it enters the BS coverage region which carrier is a primary carrier and which carrier is a secondary carrier. To allow an SS to distinguish between a primary carrier and a secondary carrier the SS is provided with logic that will identify certain characteristics of the carriers to enable the SS to make the distinction. Several possibilities exist in this regard:

1. The secondary carriers are devoid of preamble or sync channel. In this fashion, an SS will not be able to perform synchronization with a secondary carrier. Since only the primary carriers have a preamble or sync channel, the SS will be able to perform synchronization with a primary carrier and perform the network entry procedure via the primary carrier.

2. The secondary carrier has a preamble or sync channel. However, one of the broadcast channels, such as the primary broadcast channel is not present. When the SS performs synchronization with the secondary carrier it will search for the broadcast channels that are deemed to exist and if one or more are missing then the SS will determine that this is a secondary carrier. On the other hand if all the expected broadcast channels are identified, the SS determines that it has performed synchronization with a primary carrier and can proceed with network entry.

3. The secondary carrier contains a preamble/sync channel and all the expected broadcast channels, such as both the primary and the secondary broadcast channel. In this instance either one or both of the primary and secondary broadcast channels carry control information to indicate whether the carrier is primary or secondary. In this example, the SS will perform synchronization with the secondary carrier and will read the control information in the primary/secondary broadcast channel. If the information states that the carrier is a secondary carrier then the MS will not attempt a network entry; rather it will continue searching for a primary carrier.

4. The secondary carrier contains a preamble or sync channel that is encoded with information to indicate to the SS that the carrier is a secondary carrier. An example of such encoding is to provide a unique preamble sequence allowing the SS to distinguish between a primary carrier and a secondary carrier.

Figure 14:
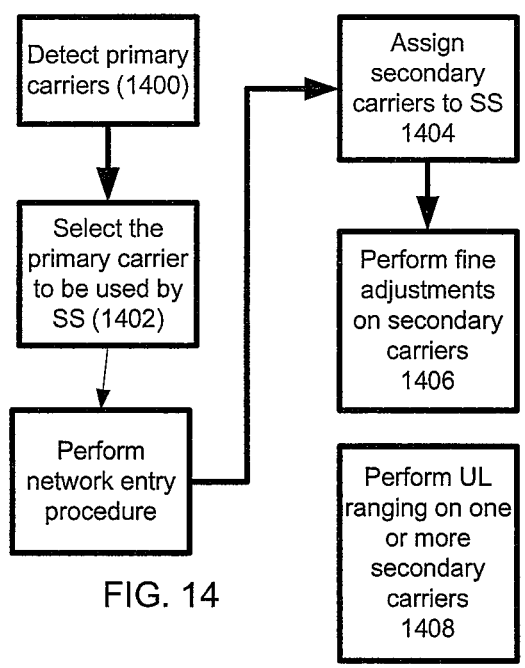
FIG. 14 is a high level block diagram of a process for distinguishing between primary and secondary carriers when an SS is performing network entry operation.

FIG. 14 illustrates generally the process that is implemented by an SS/BS to perform a network entry procedure.

At the first step 1400, the SS performs a "scan" of the spectrum to identify a primary carrier associated with the BS. In doing so, the SS may first find a secondary carrier but that carrier is discarded by using any one of the options discussed earlier. As soon as a primary carrier is identified the SS will scan the broadcast channel of the primary carrier in order to extract control information that helps the SS determining which primary carrier should be used for network entry procedure. This is illustrated at step 1402. Since several primary carriers are available, some of those may be better suited than others. For example, one of the primary carriers may be more loaded than another one and, for load balancing reasons it makes more sense for the SS to perform the network entry procedure on the primary carrier that has the lighter load.

Examples of control information that can be carried in the broadcast channel of the primary carrier include information on the loading condition of the carrier, and service or QoS offered on the carrier, among others. The SS includes logic implemented in software that executes on the CPU of the SS that determines on the basis of this control information if the network entry procedure should be performed on this primary carrier or on another primary carrier. The logic can work in different ways and use different criteria for making the selection. One option is to compare the control information with certain target values (of QoS for example) that represent the lowest quality connection acceptable. If the target values are not met, the SS will discard this primary carrier and will continue searching for a more suitable primary carrier.

Another possibility is to broadcast over the primary carrier control information about all the other primary carriers associated with the BS, such that the SS can compare them and determine which one is best for network entry and subsequent communication service.

Once a suitable primary carrier has been identified, the SS performs network entry procedure. The network entry procedure is illustrated in greater detail by the flowchart at FIG. 15. Note that some of the steps may be performed in part or in full during the identification of the primary carrier to use.

The network entry procedure starts with DL synchronization step 1500 during which the SS will determine the proper synchronization code to use such that it can receive data. At step 1502, the SS will extract system information that is transmitted by the BS. One specific example of system information that can be transmitted is the assignment of specific secondary carriers, as it will be discussed in greater detail later. UL ranging/synchronization is performed at step 1504. This requires the SS to send one or more ranging request packets that are processed by the BS to identify the timing of the request. The BS responds with a ranging response packet giving time and power adjustment informations, among others to the SS.

Authentication and security association are established at step 1506. This process involves the data exchange allowing the BS to validate the SS and as well as setting up a secure communication link. At step 1508 the SS sends information to the BS about its respective capabilities such that the BS is aware as to the type of services/communication protocols and features that can be made available to the SS. The network entry terminates at step 1510 where the connection with the network is now established.

Referring back to FIG. 14, in particular to step 1404 where the BS assigns one or more of the secondary carriers to the SS. The assignment is done by sending to the SS control information over the primary carrier that identifies the one or more secondary carriers to be used. In one specific example, the SS will use the same timing, frequency and power adjustments for the secondary carrier as those for the primary carrier. In this case, the SS will not be required to perform UL ranging for time, frequency synchronization and power adjustment purposes on the secondary carrier. Note however, that the SS may be provided with logic to fine tune the timing/frequency synchronization/power settings on the secondary carrier. This fine tuning operation is illustrated at step 1406. The purpose is to slightly adjust those parameters to improve the data communication parameters of the link. The fine tuning operation is done in two steps. During the first step, the MS will perform measurement on the preamble and/or pilot of the secondary carrier. During the second step, those measurements are processed to derive correction parameters that are implemented. Further measurements can then be made to further fine tune the timing/frequency synchronization/power. The process can be iteratively repeated as many times as desired.

Note that the assignment of the secondary carriers can be done statically or dynamically. A static assignment is an assignment where the secondary carriers are assigned once and that assignment does not change over time. A dynamic assignment process re-evaluates periodically the secondary carriers to determine of a change is required. A dynamic assignment process would be initiated by the BS which sends control information to the SS to notify the SS of a change of secondary carriers. In essence the process described at step 1404 is repeated, including the fine adjustment on the secondary carriers.

Yet another possibility to consider is for the BS to send control information to force the SS to perform UL ranging with one or more secondary carriers. This is shown at step 1408. The UL ranging process is triggered by the SS in response to control information sent by the BS over the primary carrier. The UL ranging on one or more of the secondary carriers can be done at intervals on the basis of pre-determined schedule. Alternatively the UL ranging can be performed only when the secondary carriers are being assigned to the SS.

Note that the assignment process of the secondary carriers is dependent on the capabilities of the SS. For a multi-radio SS or wide band SS where the SS can simultaneously decode multiple carriers, the SS can decode the broadcast channels of secondary carriers or other primary carriers. In this instance, the BS sends control information on the primary carrier which indicates to the SS to decode the broadcast channels of a specific set of secondary carriers.

For a single radio SS or non-contiguous spectrum, where the SS cannot simultaneously decode multiple carriers, the BS also conveys the system information about the secondary carriers to use, over the primary carrier. The SS can then decode the broadcast channel of the secondary carrier(s), but can operate on one carrier at a time (primary or secondary).

This process is illustrated at FIG. 16. At step 1600, after the BS has determined which secondary carriers to assign to a certain SS, the BS will generate control information which is sent to the SS over the primary carrier. The control information is processed by the SS at step 1602. At step, 1604 the SS will start decoding the specific broadcast channels of secondary carriers indicated by the control information received.

Figure 17:
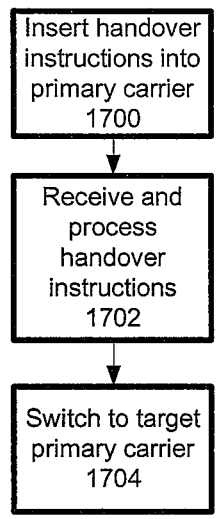
FIG. 17 is a block diagram of a process for performing handover in a wireless multi carrier system.

Handover operations in the context of wireless multi carrier systems are performed by taking into account both the primary carrier and the secondary carriers. In the case of an intra-BS handover, where the SS will switch from one primary carrier to another primary carrier associated with the same BS, the process, as illustrated at FIG. 17 starts by inserting control information in the primary carrier which will trigger the handover process. This is shown at step 1700. Intra-BS handover can be done for the purpose of load balancing for example. The BS monitors the loading on each primary carrier and if one of the primary carriers is near load capacity the BS instructs one or more of the SSs associated with that primary carrier to switch over to another primary carrier. To effect the switch, the BS will insert into the primary carrier control information that will indicate which other primary carrier to switch to as well as timing information specifying the exact moment the switch should be made.

As illustrated at step 1702, the SS will receive the control information and process it. At the exact action time, the SS will start decoding the broadcast channel of the target primary carrier to make the switch effective, as shown at step 1704.

During the intra-BS handover, the SS may retain the original secondary carrier assignment or may change it. A change may be done if there is some operational benefit to associate the SS with a new set of secondary carriers, such as better QoS, the original secondary carriers are overloaded, etc. If a change of secondary carriers is not required the switch from one primary carrier to another primary carrier does not affect the secondary carriers associated with the SS. On the other hand, if a change of secondary carriers is desirable, two options are possible. One option is to send control information over the original primary carrier which indicates in addition to the target primary carrier new secondary carriers to use by the SS. The control information also specifies the time at which the SS should start decoding the broadcast channels of the new secondary carriers. In this fashion, at the exact action time the SS starts decoding the broadcast channel of the target primary carrier and the broadcast channels of the secondary carriers.

Another possibility is to effect the secondary carrier switch in two steps, first by switching the primary carrier and once the SS starts receiving control information over the target primary carrier, then perform the secondary carrier switch. More specifically, control information is sent over the newly acquired primary carrier which indicates which are the secondary carriers to use. Note that a switch of secondary carriers may include a switch of all the secondary carriers (when the SS is associated with a plurality of secondary carriers) or a change of only one secondary carrier while another secondary carrier remains unchanged.

In the case of an inter-BS handover the entire set of carriers, namely the primary carrier and the secondary carriers are switched to a new primary carrier and a secondary carrier of the new BS. To facilitate this process, the currently serving BS broadcasts/multicasts/uncasts the neighboring BS multi-carrier configuration information to the SS. The SS will process the information, store it and when the handover is initiated use the information to connect with the primary and secondary carriers of the new BS.

Figure 18:
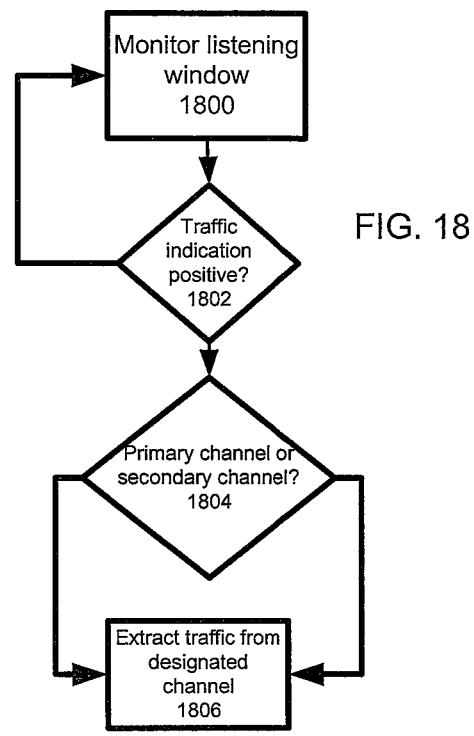
FIG. 18 is a block diagram of a process for performing sleep mode management in a wireless multi carrier system.

The sleep mode operation management in a multi carrier environment is illustrated at FIG. 18. When the SS is in a sleep mode it follows a set of predetermined sleep mode parameters, which define a sleep window during which the SS is not listening and a listening window in which the SS is listening for traffic indication. As shown at step 1800, the BS would notify the SS that it has traffic scheduled for it by placing a positive traffic indication in a listening window. The listening window is implemented over the primary carrier. The SS monitors the listening window and goes to sleep during the sleep window.

At decision step 1802, the logic processing the contents of the listening window determines if it contains a positive traffic indication for the SS. In the negative, the process returns to step 1800 to monitor the contents of the next listening window.

If a positive traffic indication is identified, the SS processes the data to determine over which carrier the data traffic is expected to occur. This is shown at step 1804. The data traffic indication may indicate that the data traffic will occur over the primary carrier or over a secondary carrier. The mobile will then monitor the designated carrier to extract the data traffic. This is shown at step 1806.

The idle mode operation is the same for a single carrier and a multi carrier environment. The BS derives for the SS idle mode parameters that include a paging listening window configuration and a paging unavailable window configuration. During the paging listening window, the SS monitors the paging indication and message on the primary carrier. When paged, the SS performs a network re-entry procedure on the primary carrier.

Figure 19:
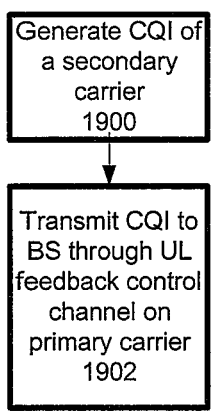
FIG. 19 is a block diagram of a process for providing to a BS feedback on channel quality, according to a first example of implementation of the invention.
Figure 20:
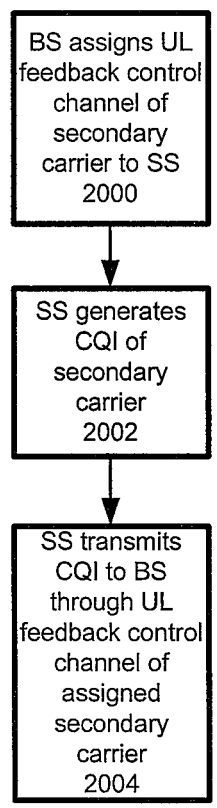
FIG. 20 is a block diagram of a process for providing to a BS feedback on channel quality, according to a second example of implementation of the invention.
Figure 21:
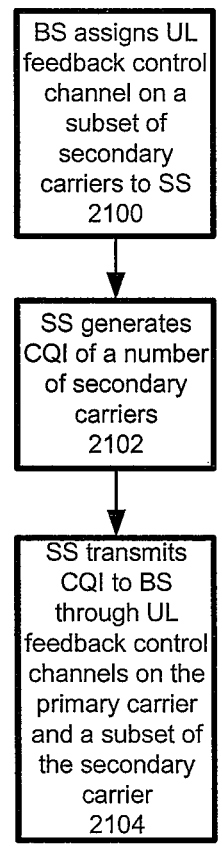
FIG. 21 is a block diagram of a process for providing to a BS feedback on channel quality, according to a third example of implementation of the to invention.

FIGS. 19, 20 and 21 illustrate different examples of a channel quality feedback procedure in a multi carrier environment. FIG. 19 illustrates a first example in which the SS reports Channel Quality Information (CQI) of a secondary carrier. In this case, the secondary carrier is not assigned a UL feedback control channel so the CQI is reported over a carrier other than the one which is being monitored. The SS determines the CQI in connection with the secondary carrier of interest, as shown at step 1900 and transmits the CQI through the UL feedback control channel over the primary carrier. This is illustrated at step 1902. The CQI transmission includes an identification of the secondary carrier for which the reporting is being done such that the BS can adequately identify the carrier upon receipt of the CQI information.

FIG. 20 illustrates another example of implementation. In this example the BS assigns at step 2000 a UL feedback control channel to the secondary carrier associated with the SS. At step 2002 the SS determines the CQI associated with that secondary carrier and transmits it to the BS over the UL feedback control channel, as shown at step 2004. Note that when several secondary carriers are assigned to the SS, the same process can be replicated in connection with each secondary carrier, namely each secondary carrier is assigned a UL feedback control channel and the CQI of each secondary carrier is forwarded to the BS over the respective UL feedback control channel.

FIG. 21 illustrates yet another example of channel quality feedback. In this instance the BS assigns a UL feedback control channel in connection with a subset of secondary carriers. In other words, one UL feedback control channels is assigned the task of carrying CQI relating to several secondary carriers. This is shown at step 2100. At step 2102 the SS will generate CQI values for each of the secondary carriers on which feedback is to be provided. The set of CQI values is packaged and sent over the BS through the assigned UL feedback control channel, as shown in step 2104. The packaging involves associating with each CQI value a tag or any other identifier that would allow the BS to associate the particular CQI value with the proper secondary carrier.

The UL feedback control channel can be implemented on the primary carrier m or on the secondary carrier. Alternatively more than one UL feedback control channel can be provided.

The above-described embodiments of the present application are intended to be examples only. Those of skill in the art may effect alterations, modifications and variations to the particular embodiments without departing from the scope of the application.

The invention claimed is:

1. A method of a subscriber station (SS) comprising:
performing network entry in a multi-carrier wireless environment using a primary carrier;
receiving timing information corresponding to the primary carrier;
receiving a first control signaling via the primary carrier, the first control signaling assigning at least one secondary carrier;
transmitting uplink data via the secondary carrier using an uplink transmission timing of the secondary carrier, the uplink transmission timing of the secondary carrier being assigned the same as an uplink transmission timing of the primary carrier; and
modifying the uplink transmission timing or frequency of the secondary carrier after transmitting the uplink data via the secondary carrier, wherein modifying the uplink transmission timing or frequency of the secondary carrier after transmitting the uplink data via the secondary carrier comprises:
measuring a preamble or pilot; and
determining an adjustment of the uplink transmission timing or frequency of the secondary carrier based on the measurement.

2. The method of claim 1, wherein the primary carrier corresponds to the carrier used for network entry.

3. The method of claim 1, wherein the primary carrier contains a synchronization channel.

4. The method of claim 1, further comprising receiving a second control signaling via the primary carrier, the second control signaling changing the primary carrier.

5. The method of claim 1, wherein the primary carrier carries voice information.

6. The method of claim 5, wherein the primary carrier carries real-time services to a user of the SS.

7. The method of claim 6, wherein the secondary carrier provides data services to a user of the SS.

8. The method of claim 7, wherein the primary carrier is code division multiplexed.

9. The method of claim 8, wherein the secondary carrier is time division multiplexed.

10. The method of claim 1, wherein the SS is responsive to a control signal sent from a base station (BS) over the primary carrier to trigger an UL transmission on the selected secondary carrier.

11. The method of claim 1, wherein modifying the uplink transmission timing of the second carrier is performed independently of the uplink transmission timing of the primary carrier.

12. An apparatus comprising:
   a transceiver; and
   a processor configured to:
      perform network entry of a subscriber station (SS) in a multi-carrier wireless environment using a primary carrier;
      receive timing information corresponding to the primary carrier;
      receive a first control signaling via the primary carrier, the first control signaling assigning at least one secondary carrier;
      transmit uplink data via the secondary carrier using an uplink transmission timing of the secondary carrier, the uplink transmission timing of the secondary carrier being assigned the same as an uplink transmission timing of the primary carrier; and
      modify the uplink transmission timing or frequency of the secondary carrier after transmitting the uplink data via the secondary carrier, wherein modifying the uplink transmission timing or frequency of the secondary carrier after transmitting the uplink data via the secondary carrier comprises:
      measuring a preamble or pilot; and
      determining an adjustment of the uplink transmission timing or frequency of the secondary carrier based on the measurement.

13. The apparatus of claim 12, wherein the primary carrier corresponds to the carrier used for network entry.

14. The apparatus of claim 12, wherein the primary carrier contains a synchronization channel.

15. The apparatus of claim 12, the processor further configured to receive a second control signaling via the primary carrier, the second control signaling changing the primary carrier.

16. The apparatus of claim 12, wherein the primary carrier carries voice information.

17. The apparatus of claim 16, wherein the primary carrier carries real-time services to a user of the SS.

18. The apparatus of claim 17, wherein the secondary carrier provides data services to a user of the SS.

19. The apparatus of claim 18, wherein the primary carrier is code division multiplexed.

20. The apparatus of claim 19, wherein the secondary carrier is time division multiplexed.

21. The apparatus of claim 12, wherein the SS is responsive to a control signal sent from a base station (BS) over the primary carrier to trigger an UL transmission on the selected secondary carrier.

22. The apparatus of claim 12, wherein modifying the uplink transmission timing of the second carrier is performed independently of the uplink transmission timing of the primary carrier.

23. A method of a subscriber station (SS) comprising:
   performing network entry in a multi-carrier wireless environment using a primary carrier;
   receiving timing information corresponding to the primary carrier;
   receiving a first control signaling via the primary carrier, the first control signaling assigning at least one secondary carrier;
   initially assigning an uplink transmission timing of the secondary carrier based on an uplink transmission timing of the primary carrier; and
   prior to transmitting uplink data via the secondary carrier using the uplink transmission timing of the secondary carrier, modifying the uplink transmission timing or frequency of the secondary carrier, wherein modifying the uplink transmission timing or frequency of the second carrier after transmitting the uplink data via the secondary carrier comprises:
   measuring a preamble or pilot; and
   determining an adjustment of the uplink transmission timing or frequency of the secondary carrier based on the measurement.

* * * * *